(12) United States Patent
B'Far et al.

(10) Patent No.: US 8,527,443 B2
(45) Date of Patent: Sep. 3, 2013

(54) TECHNIQUES FOR PROCESSING ONTOLOGIES

(75) Inventors: Reza B'Far, Huntington Beach, CA (US); Ryan Golden, Austin, TX (US); Yasin Cengiz, Santa Ana, CA (US); Tsai-Ming Tseng, Santa Ana, CA (US)

(73) Assignee: Oracle International Corporation, Redwood Shores, CA (US)

( * ) Notice: Subject to any disclaimer, the term of this patent is extended or adjusted under 35 U.S.C. 154(b) by 758 days.

(21) Appl. No.: 12/576,176

(22) Filed: Oct. 8, 2009

(65) Prior Publication Data

US 2011/0087629 A1    Apr. 14, 2011

(51) Int. Cl.
G06F 17/16    (2006.01)
G06F 17/40    (2006.01)
G06F 17/30    (2006.01)

(52) U.S. Cl.
USPC ................................. 706/46; 707/778

(58) Field of Classification Search
USPC ................................................. 706/46
See application file for complete search history.

(56) References Cited

U.S. PATENT DOCUMENTS

| | | |
|---|---|---|
| 7,792,783 B2 | 9/2010 | Friedlander et al. |
| 2005/0149230 A1 | 7/2005 | Gupta et al. |
| 2007/0011175 A1 | 1/2007 | Langseth et al. |
| 2007/0124263 A1 | 5/2007 | Katariya et al. |
| 2007/0239666 A1 | 10/2007 | Garcia |
| 2008/0256121 A1 | 10/2008 | Liu et al. |

OTHER PUBLICATIONS

Soma et al., Parallel Inferencing for OWL Knowledge Bases. [online], 2008 [retrieved on Jun. 14, 2012]. Retrieved from the Internet: <URL:http://halcyon.usc.edu/~pk/prasannawebsite/papers/ram_icpp08.pdf>.*
Soma et al., A Data Partitioning Approach for Parallelizing Rule Based Inferencing for Materialized OWL Knowledge Bases [online], Apr. 4, 2008 [retrieved on Jan. 9, 2013]. Retrieved from the Internet<URL:http://bluecoat-01/?cfru=aHROcDovL3Bncm91c C51c2MuZWR1L3Bncm91cFcvaW1hZ2VzLzQvNGEvUG FwZXJfMjAwOF82LnBkZg==>.*
Astrova, et al., "Rule-Based Transformation of SQL Relational Databases to OWL Ontologies," 2$^{nd}$ International Conference on Metadata and Semantics Research, 16 pages. (Oct. 2007).
B'Far, et al., "SDR: An Architectural Approach to Distribution of Complex Ontology Processing," Proc. SWWS, pp. 10-18 (2009).

(Continued)

Primary Examiner — Jeffrey A Gaffin
Assistant Examiner — Nathan Brown, Jr.
(74) Attorney, Agent, or Firm — Kilpatrick Townsend & Stockton LLP (57) ABSTRACT

Techniques for processing ontologies include a computer-implemented method of processing an ontology. The method includes storing data in an ontology and partitioning the ontology into a plurality of partitions. The partitions are distributed among a plurality of reasoner instances. The reasoner instances are directed to reason the partitions and the results from the reasoner instances are combined. If data is changed, an inference library resulting from the combined results may be updated by updating only those portions of the inference library affected by the changed data.

20 Claims, 5 Drawing Sheets

(56) References Cited

OTHER PUBLICATIONS

Calvanese, et al., "Tailoring OWL for Data Intensive Ontologies," *Proceedings of the OWL: Experiences and Directions Workshop*, 10pp. (2005).

Codd, E. F., "A Relational Model of Data for Large Shared Data Banks," *Communications of the ACM*, vol. 13, No. 6, pp. 377-387 (Jun. 1970).

Dean, Jeffery and Sanjay Ghemawat, "MapReduce: Simplified Data Processing on Large Clusters," Sixth Symposium on Operating Systems Design and Implementation, 15 pages. (2004).

Dean, Mike and Guus Schreiber, eds., "Web Ontology Language Reference," WC3 Recommendation, http://www.w3.org/TR/owl-ref/, 55pp. (Feb. 10, 2004).

Oxford English Dictionary, "Definition of 'Semantic'," Oxford English Dictionary Online, http://oxforddictionaries.com/definition/semantic, 1 pp. (Jun. 9, 2011).

Park, et al, "An Efficient and Scalable Management of Ontology," Proceedings of the 12th International Conference of Database Systems for Advanced Applications, *Lecture Notes on Computer Sciences*, vol. 4443, pp. 975-980 (Apr. 2007).

Reiter, R., "On Closed World Data Bases," in *Logic and Data Bases*, Gallaire & Minker, eds., pp. 55-76, Plenum Press: New York (1978).

Sequeda et al, "A Bootstrapping Architecture for Integration of Relational Databases to the Semantic Web," *Proceedings of the Poster and Demonstration Session at the 7th International Semantic Web Conference* (ISWC), 2 pp. (2008).

Shen, et al., "Research on Rules of Mapping from Relational Model to OWL," *Proceedings of OWLED '06*, 9pp. Athens, Georgia (Nov. 2006).

Sonia, Kiran and Sharifullah Khan, "R2o Transformation System: Relation to Ontology Transformation for Scalable Data Integration," *Proceedings of the 2008 International Symposium on Database Engineering* (2008).

Tirmizi et al, "Translating Sql Applications to the Semantic Web," *Proceedings of the 19th International Conference on Database and Expert Systems Applications*, 2 pp. (2008).

Clark & Parsia, LLC, "Introducing Pronto: Probabilistic DL Reasoning in Pellet". [online] 2007 [retrieved on Jul. 11, 2012]. Retrieved from the Internet: <URL: http://weblog.clarkparsia.com/2007/09/27/introducing-pronto>.

Friedman-Hill, Ernest, "Jess®: The Rule Engine for the Java™ Platform," Version 7.1p2 [online] 2008 [retrieved on Jul. 11, 2012]. Retrieved from the Internet: <URL: http://www.jessrules.com/jess/docs/Jess71p2.pdf>.

SAAD, Yousef. *Iterative Methods for Sparse Linear Systems*. [online]. 2000 [retrieved on Nov. 26, 2012]. Retrieved from the Internet: <URL: http://www.stanford.edu/class/cme324/saad.pdf>.

\* cited by examiner

$$\begin{array}{c} \phantom{P_1}\phantom{\begin{bmatrix}1\end{bmatrix}}\text{A}\phantom{1}\text{B}\phantom{1}\text{C}\phantom{1}\text{D}\phantom{1}\text{E}\phantom{1}\text{F}\phantom{1}\text{G}\phantom{1}\text{H}\phantom{1}\text{I}\phantom{1}\text{J} \end{array}$$

|    | A | B | C | D | E | F | G | H | I | J |
|----|---|---|---|---|---|---|---|---|---|---|
| $P_1$ | 1 | 1 | 0 | 0 | 0 | 0 | 0 | 0 | 0 | 0 |
| $P_2$ | 1 | 0 | 1 | 0 | 0 | 0 | 0 | 0 | 0 | 0 |
| $P_3$ | 1 | 0 | 0 | 1 | 0 | 0 | 0 | 0 | 0 | 0 |
| $P_4$ | 0 | 1 | 1 | 0 | 0 | 0 | 0 | 0 | 0 | 0 |
| $P_5$ | 0 | 0 | 1 | 0 | 1 | 0 | 0 | 0 | 0 | 0 |
| $P_6$ | 0 | 0 | 0 | 1 | 1 | 0 | 0 | 0 | 0 | 0 |
| $P_7$ | 0 | 0 | 0 | 0 | 1 | 1 | 0 | 0 | 0 | 0 |

→ 500, 504

$$\begin{bmatrix} 1 & 1 & 1 & 0 & 1 & 1 \\ 1 & 0 & 0 & 1 & 1 & 1 \\ 1 & 0 & 1 & 1 & 1 & 1 \\ 0 & 1 & 1 & 0 & 1 & 1 \\ 0 & 0 & 1 & 0 & 1 & 1 \end{bmatrix}$$

506

|    | A | B | C | D | E | F | G | I | H | J |
|----|---|---|---|---|---|---|---|---|---|---|
| $P_7$  | 0 | 0 | 0 | 0 | 1 | 1 | 0 | 0 | 0 | 0 |
| $P_8$  | 0 | 0 | 0 | 0 | 0 | 1 | 1 | 0 | 0 | 0 |
| $P_9$  | 0 | 0 | 0 | 0 | 0 | 0 | 1 | 0 | 1 | 0 |
| $P_{10}$ | 0 | 0 | 0 | 0 | 0 | 0 | 1 | 1 | 0 | 0 |
| $P_{11}$ | 0 | 0 | 0 | 0 | 0 | 0 | 0 | 1 | 1 | 0 |
| $P_{12}$ | 0 | 0 | 0 | 0 | 0 | 0 | 0 | 1 | 0 | 1 |

→ 502

$$\begin{bmatrix} 1 & 1 & 1 & 1 & 0 & 1 \\ 1 & 1 & 1 & 0 & 1 & 0 \end{bmatrix}$$

|   | A | B | C | D | E | F | G | I | H | J |
|---|---|---|---|---|---|---|---|---|---|---|
|   | 1 | 1 | 1 | 0 | 1 | 1 | 1 | 1 | 0 | 1 |
|   | 1 | 1 | 1 | 0 | 1 | 1 | 1 | 0 | 1 | 0 |
|   | 1 | 0 | 1 | 1 | 1 | 1 | 1 | 0 | 1 | 0 |
| 600 | 1 | 0 | 1 | 1 | 1 | 1 | 1 | 1 | 0 | 1 |
|   | 1 | 0 | 0 | 1 | 1 | 1 | 1 | 1 | 0 | 1 |
|   | 1 | 0 | 0 | 1 | 1 | 1 | 1 | 0 | 1 | 0 |
|   | 0 | 1 | 1 | 0 | 1 | 1 | 1 | 0 | 1 | 0 |
|   | 0 | 1 | 1 | 0 | 1 | 1 | 1 | 1 | 0 | 1 |
|   | 0 | 0 | 1 | 0 | 1 | 1 | 1 | 1 | 0 | 1 |
|   | 0 | 0 | 1 | 0 | 1 | 1 | 1 | 0 | 1 | 0 |

TECHNIQUES FOR PROCESSING ONTOLOGIES

BACKGROUND OF THE INVENTION

Embodiments of the present invention relate to ontologies, and more specifically to techniques for creating ontologies from other data sources.

Businesses often have internal business policies intended to address a wide range of issues such as security, privacy, trade secrets, criminal activity of employees or others with access to the business, and many others. These business policies address various aspects of a business, such as purchasing, selling, marketing, and internal administration. Because of the large number of activities occurring during the course of running a business, which may have various entities located in a variety of geographical locations, it is often impractical to manually monitor all activities in which improper behavior or mistakes may occur.

One approach to implementing business policies has been to monitor and control computer systems used to facilitate a business' activities. For example, information regarding various activities, such as sales and payroll, are often stored in one or more data stores. This information may be analyzed to find activity that might be in violation of a business policy, such as an item on an invoice or paycheck to an employee being outside of a specified range, or a particular employee attempting to access information to which he or she is not entitled access.

One approach to monitoring and controlling a business' computer systems involves storing business data in one or more ontologies. With the advent of semantic technologies, the importance of ontologies and semantic query languages has grown manifold. An ontology is a formal representation of knowledge, specifically a formal representation of a set of concepts within a domain and relationships between the concepts. Ontologies are used in several different areas including business analytics, enterprise systems, artificial intelligence and the like, and have the potential to be used in several other fields and applications.

An ontology is typically encoded using an ontology language. Several ontology languages are available. The OWL Web Ontology Language has become the industry standard for representing web ontologies. OWL can be used to explicitly represent the meaning of terms in vocabularies and the relationships between the terms. OWL thus provides facilities for expressing meaning and semantics that goes far beyond the capabilities of languages such as XML. OWL is being developed by the Web Ontology Working Group as part of the W3C Semantic Web Activity. Further information related to OWL may be found at the W3C website.

An ontology may be persisted in memory such as in a database or other data store. There are several standard ways of querying and manipulating the data in an ontology using query languages such as RDQL (Resource Description Format Query Language), OWL-QL, SPARQL (SPARQL Protocol and RDF Query Language), and others. Among the ontology query languages, SPARQL is considered by many to be the de facto industry standard.

In the context of a business, data from one or more data stores may be periodically compiled in an ontology, such as in a batch process occurring at times when there is less use of the business' computer systems, such as at night when most employees are not present. Once compiled in an ontology, an ontology reasoner can be used to make logical inferences from the ontology. Generally, an ontology reasoner is a module implemented in hardware or software executed by a processor, configured to infer logical consequences from a set of facts or axioms stored in an ontology. Ontology reasoners are also known as reasoning engines, rules engines, or simply reasoners. Examples include RETE-based rules engines such as JESS, a rules engine for the Java platform, available for download at http://www.jessrules.com, and probabilistic description logic reasoners such as Pronto, available from Clark & Parsia LLC, located at 926 N St. NW Rear, Studio #1, Washington, D.C. 20001. Ontology reasoners typically incorporate algorithms that, if possible, avoid analyzing complete data sets, and instead analyze only relevant data.

Often businesses have large data sets stored in their data stores and, as a result, ontologies formed from the large data sets are themselves complex, often too complex for a single processor implementing a reasoner to handle efficiently. Attempts to address this issue often suffer a disadvantage in that any change in the ontology's data causes the data to become stale or triggers reasoners to go through the entire data set, thereby negating any advantage gained.

BRIEF SUMMARY OF THE INVENTION

Embodiments of the present invention provide techniques for reasoning ontologies. In one embodiment, a computer-implemented method of processing an ontology is provided. The method includes storing data in an ontology and partitioning the ontology into a plurality of partitions. The partitions are distributed among a plurality of reasoner instances and the reasoner instances are directed to reason the partitions. Results from the reasoner instances are combined.

In an embodiment, each partition is a sub-ontology of the ontology. The ontology may include a plurality of triples and partitioning the ontology may include representing the triples as vectors in a matrix and partitioning the matrix into block form, where each block of the matrix may represent a sub-ontology of the ontology. In an embodiment, each of the partitions is separately processable by one or more reasoners. A changed datum may be associated with a subset of the partitions and updating the results from the reasoner instances may include updating the subset of the partitions associated with the changed datum. Similarly, combining results from the reasoner instances may include creating an inference library that includes a plurality of inferred triples and updating the subset may include updating the inference library by updating portions of the inference library affected by the change in said datum.

In accordance with another embodiment, a computer-readable storage medium having stored thereon instructions for causing at least one processor to perform method for processing ontological data is provided. The computer-readable storage medium includes instructions for distributing ontological data among a plurality of ontologies, for directing a plurality of reasoner instances to reason said ontologies to produce a first set of inferences, and for directing at least one reasoner instance to reason said first set of inferences to produce a second set of inferences.

The ontological data may include a plurality of triples. In an embodiment, distributing the ontological data includes representing the triples as vectors in a matrix and partitioning the matrix into block form. The matrix, when in block form, may comprise a plurality of blocks where each block corresponds to one of the ontologies. In an embodiment, the computer-readable storage medium includes instructions for changing a datum of the ontological data. The datum may be associated with a subset of the ontologies and the computer-readable medium may include instructions for updating the subset according to the datum. In an embodiment, the computer-readable medium includes instructions for creating an inference library and for updating portions of the inference library affected by the change in said datum. Instructions for creating an inference library comprising a plurality of inferred triples may also be included.

In accordance with yet another embodiment, a system for processing ontologies is provided. The system includes a data store, a plurality of reasoners, and at least one processor. The data store stores an ontology and each reasoner is operable to reason a partition of the ontology. At least one processor is operable to partition the ontology into a plurality of partitions, distribute the partitions among the plurality of reasoners, direct the reasoners to reason the partitions, and combine results from the reasoners.

In accordance with an embodiment, each partition is a sub-ontology of the ontology. The ontology may also include a plurality of triples represented as vectors in a matrix and the at least one processor may be operable to partition the matrix into block form where the matrix comprises a plurality of blocks. The ontology, in an embodiment, includes a plurality of triples represented as vectors in a matrix. The matrix may be in block form, having a plurality of blocks, where each of the blocks corresponds to a sub-ontology of the ontology. Each of the plurality of partitions may be separately processable by at least one of the plurality of reasoners. The at least one processor, in an embodiment, is further operable to create an inference library comprising a plurality of inferred triples and update the reference library by updating triples of the inference library affected by a changed datum of said data.

DESCRIPTION OF THE INVENTION

In the following description, for the purposes of explanation, specific details are set forth in order to provide a thorough understanding of embodiments of the invention. However, it will be apparent that the invention may be practiced without these specific details.

The following description describes an embodiment of the present invention in the business policy domain, and specifically with implementing business policies using ontologies that encode business data. However, the scope of the present invention is not restricted to business policies, but may be applied to other domains or applications. For example, any domain or application where a set of rules or criteria is used to analyze data may make use of the present invention. Examples of domains in which embodiments of the present invention may be used include segregation of duties, separation of powers, transaction monitoring, fraud or other crime detection, semantic web applications, and generally applications dealing with large sets of data.

In general, embodiments of the present invention provide techniques for processing one or more ontologies, where the ontologies encode data such as business data. Processing ontologies can be used, for example, in order to implement business policies where, unless otherwise clear from context, a policy is a set of one or more conditions and a set of one or more actions to be taken when the one or more of the conditions are met. For example, a policy may specify that all transactions of a certain type (such as credit card charges) over a specified amount require approval by a person of a specified class, such as a manager. In this example, the conditions of the policy are that transactions have a specified type and amount and an action of the policy is authorization of transactions meeting the conditions by a person of a specified class. An action of a policy may also be simply identification of data that meets the policy's condition(s). For instance, a policy may specify that all transactions of a certain type and over a certain amount should be identified. In this example, the conditions are the same as in the previous example, but the action is identification of transactions meeting the conditions so that, for example, a manager may review the identified transactions and investigate any transactions he or she deems suspicious.

Typically a policy is used to implement a business policy which is one or more rules, guidelines, and/or principles related to the conduct of a business. For instance, a business policy specifying that invoices over a specific amount require manager approval may be implemented by creating a policy that includes criteria for identifying invoices over the specified dollar amount from information stored in one or more data stores.

In a specific embodiment, business data is encoded in an ontology and the ontology is processed in order to ensure that business policies are followed. Processing the ontology involves applying graph partitioning techniques in order to distribute the data over a plurality of reasoner instances, where a reasoner instance is one or more processors implementing one or more reasoners. Typically, each reasoner instance will comprise a single processor implementing a single reasoner, although more processors and/or reasoners may be possible in a reasoner instance. MapReduce techniques, discussed below, may be used to coordinate the actions of a plurality of reasoners operating over the nodes. Algorithmic matrix-based methodology is used throughout the partitioning and reasoning process.

Figure 1:
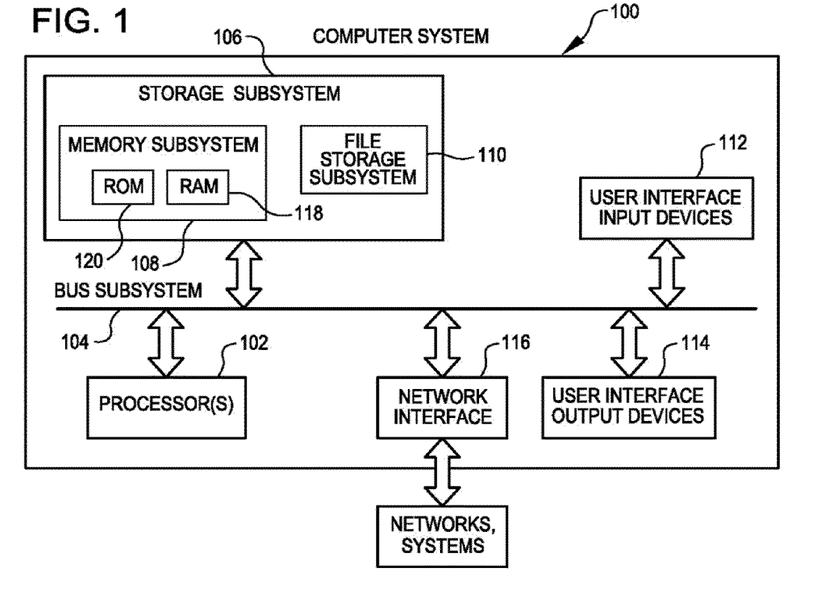
FIG. 1 shows a simplified block diagram of a computer system that may be used to practice an embodiment of the present invention.

Turning now to the drawings, FIG. 1 is a simplified block diagram of a computer system 100 that may be used to practice an embodiment of the present invention. Computer system 100 may serve as a user workstation or server, such as those described in connection with FIG. 2 below. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device in order to execute commands in connection with implementation of specific embodiments of the present invention, such as to implement, define policies, and/or configure various components of an enterprise system, such as that described below in connection with FIG. 2.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Results of implementing policies, defining policies, and configuring various components of a computer system may be output to the user via an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, personal digital assistant (PDA), cellular telephone, a server, or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
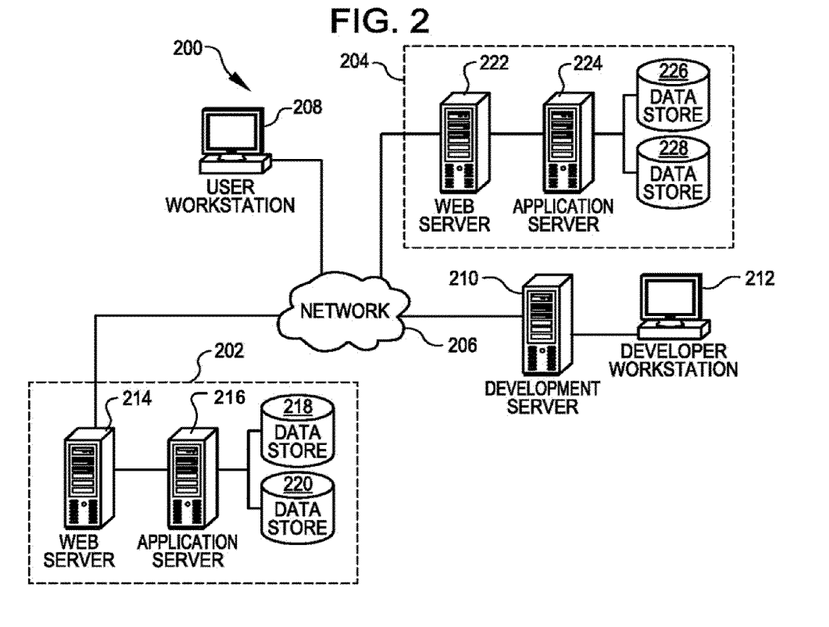
FIG. 2 shows an example of an environment in which embodiments of the present invention may be practiced.

FIG. 2 shows a simplified block diagram of an enterprise computer system 200 that may be used to practice an embodiment of the present invention. It should be understood that, generally, enterprise computer systems vary greatly and, as a result, specific embodiments may include more or less components than shown in the figure and that the specific components shown in FIG. 2 are only intended to provide an example for the purposes of illustration.

In accordance with an embodiment, the enterprise computer system 200 includes a first location 202 and a second location 204 communicatively connected by a network 206, such as the Internet or any suitable communications network or combination of networks. In an embodiment, the first location 202 and second location 204 correspond to separate physical locations of a business, such as offices in two separate cities, states, or countries. While FIG. 2 shows two locations, it should be understood that a business may have only a single location and may include more than two locations. As shown in the drawing, the enterprise computer system 200 may include one or more user workstations 208, a development server 210, and a developer workstation 212. The user workstation 208, development server 210, and/or development workstation 212 may be physically present at any of the locations, or at separate locations. In an embodiment, the user workstation 208 and development server 210 are communicatively connected to the network 206 so as to access various components of the enterprise computer system. For example, the user workstation 208 may include a browser used for viewing content provided from the Internet and/or from other systems within the business. Further, the developer workstation 212 may be connected to the network 206 through the development server 210 and may be adapted to enable certain employees within the organization to configure, install, modify, and perform other actions in connection with the business' computing systems. As an example, a developer within the organization may utilize the developer workstation in order to create policies that are used to define policies and execute one or more applications that stores data in one or more ontologies, and that reason the data according to the policies in accordance with various embodiments of the invention. Instructions for controlling the applications and the defined policies may be sent over the network 206 to an appropriate computing device executing the one or more applications.

As noted above, the first location 202 may include various computer systems used in operating the business. For example, as depicted in FIG. 2, the first location 202 includes a web server 214 configured to receive requests from various users, such as from a user of the user workstation 208, and to respond to the requests over the network 206. While FIG. 2 shows the web server as a hardware component, as with any of the servers described herein, the web server may also be a software module operating on a computer system. Responses from the web server 214 may be provided from the web server 214 itself or through the web server 214 but from a variety of sources in communication with the web server 214, such as from components of an internal computer system of the first location 202 or from other web servers located at other, possibly third-party, locations.

In an embodiment, the web server 214 is communicably coupled to an application server 216, which is a hardware component or software module configured to run one or more applications, such as one or more policy engines and other applications for managing organizational data. As is known, a user of the user workstation 208 may send a request to the web server 214 that specifies a specific action to be taken in connection with an internal business application implemented on the application server 216. The web server 214 then relays the request to the application server 216 which takes the specified action and returns the result of that action to the web server 214, which in turn relays the result to the user workstation 208. In accordance with an embodiment, the web server 214, or other component, may modify the content returned to the user workstation 208 in accordance with one or more policies applicable to a user of the user workstation 208.

As shown in the example of FIG. 2, the application server 216 interacts with data stored in a first data store 218 and a second data store 220, each of which may store data relevant to the business' operation, such as in one or more relational or other databases. While the disclosed example shows the first location 202 having two data stores, it should be understood that the first location 202 may have less than two data stores or more than two data stores. Information in the data stores can include a wide variety of data, such as data relating to business transactions, invoices, human resources data, user account data, receipts, bank account data, accounting data, payroll data, and generally, any data relevant to the operation of a particular business. Information from the data stores 218, 220, and other sources, may be extracted from the data stores, converted to a uniform format, and stored in an ontology in accordance with an embodiment.

In an embodiment, the second location includes its own web server 222, application server 224, first data store 226, and second data store 224 which may be configured to function similarly to the identically named components above.

Figure 6:
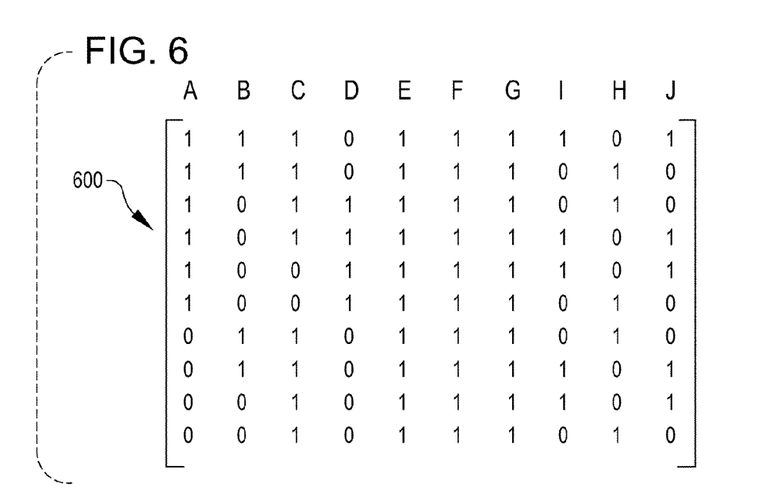
FIG. 6 shows an inference library created from the map function output of FIG. 5.
Figures 7, 8:
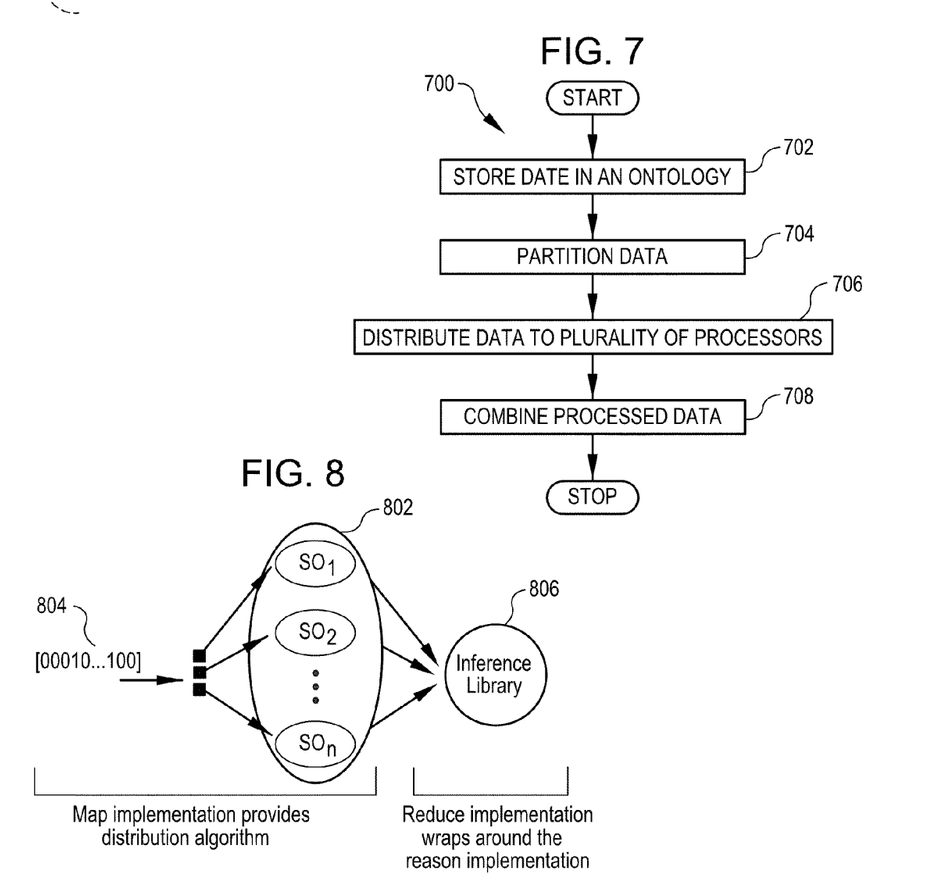
FIG. 7 shows a method for processing data according to the process demonstrated in FIGS. 3-5, in accordance with an embodiment.
FIG. 8 shows a graphical representation for updating an inference library, in accordance with an embodiment.

FIG. 7 shows a flowchart demonstrating a method 700 for processing data in accordance with an embodiment. The method 700, for example, can include techniques described below in connection with FIGS. 3-8. The method depicted in FIG. 7, or variations thereof, may be implemented by software (e.g., code, instructions, program) executing on a processor, by hardware, or combinations thereof. The software may be stored on a computer-readable storage medium, for example, in the form of a computer program comprising a plurality of instructions executable by one or more processors.

In an embodiment, data is stored in an ontology by creating ontology data from various business data sources at a data storage step 702. As noted below, the data can be enterprise business data or, generally, any type of data. Storage of the data can be performed in a variety of ways. For instance, in an embodiment, a batch process is periodically executed that causes data stored in data stores to be compiled into an ontology. For instance, data stored in a first form can be transformed using one or more adapters configured to convert data from a first form to a form suitable for storage in the ontology. In addition, automatic Extract, Transfer, and Load (ETL) operations from a business' data sources to a semantic data store that embodies the ontology may be defined and set to run when trigger conditions are met, such as at certain times or when a certain amount of data has been changed.

At a partitioning step 704, the ontology data is partitioned so as to be distributable among a plurality of processors. Each processor may implement the same or a different reasoner instance. Partitioning the data may include encoding the ontology data in a matrix, such as in a manner described below, and partitioning the matrix using one or more matrix partitioning techniques. In alternate embodiments, the ontology data is not necessarily encoded in a matrix, but is distributed using other methods. For instance, because ontologies can be represented as graphs, such as directed graphs, graph partitioning techniques may be used. Generally, any technique for partitioning data among a plurality of reasoners may be used.

At a distribution step 706, the partitioned ontology data is distributed among a plurality of processors, each of which may implement of instances of the same or a different reasoner. Techniques, such as those described in *Map Reduce: Simplified Data Processing on Large Clusters*, by Jeffery Dean and Janjay Ghemawat, published at the Sixth Symposium on Operating System Design and Implementation, which is incorporated by reference for all purposes, may be used to coordinate the actions of the reasoners. In this manner, the processing of the ontology data is performed by a plurality of reasoners so as to reduce the time necessary for processing. At a combination step 708, the results of the processing by the plurality of reasoners are combined into a set of processed data. Combination may include connecting results of separate processing according to relationships associating different sets of separately-processed data, such as data encoded in intersection vectors, such as those described above. Again, in an embodiment, MapReduce techniques may be used to coordinate combination the results from the reasoners.

In this manner, the work done in processing an ontology is performed efficiently and more quickly than if the ontology was processed with a single reasoner. Other benefits in using the above method are also incurred. For example, the embodiments of the disclosed method allow for efficient handling of new and/or modified data, as described in more detail below in connection with FIG. 8.

As businesses and other organizations operate, the data they store changes as a result of business operations. New invoices are created, new payments are made to vendors, employee roles change, new people or organizations become customers, peoples' position within an organization changes, and other events happen during the course of operating a business that may influence the addition, subtraction, or modification of associated data. Moreover, because the amount of data stored by a business is typically very large, creation or modification of an ontology based on the data typically takes a large amount of resources and, therefore, is performed as a batch process, often during times when a business' systems are under a lighter work load, such as at a time of the day when many employees may be at home or when most potential customers are asleep.

Figure 3:
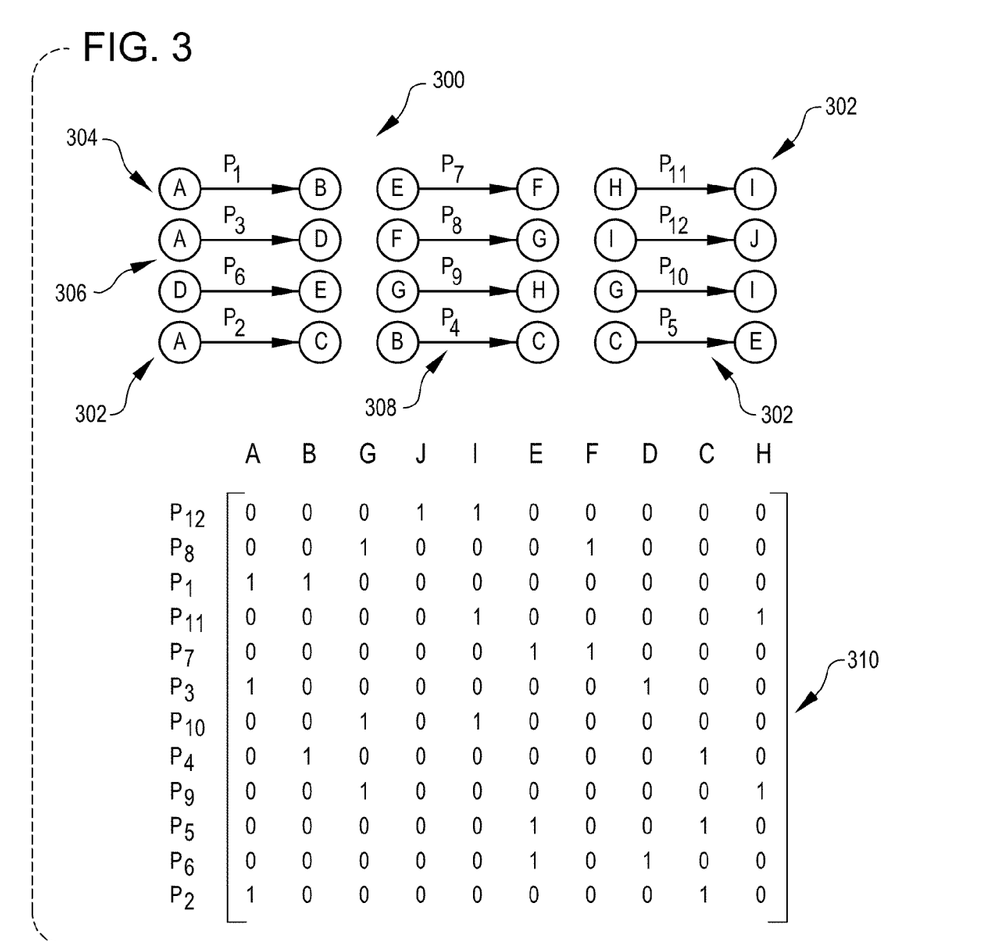
FIG. 3 shows a data set of an ontology and a matrix encoding the data set, in accordance with an embodiment.

FIG. 3 shows a representation of an example data set 300 stored in an ontology, in accordance with an embodiment. It should be understood that the data set 300 is given for purposes of illustration and typically data sets for businesses or other organizations will be larger and more complex. In an embodiment, the data set 300 comprises a plurality of triples 302 where a triple includes a first node, a second node, and a relationship between the first and second nodes. For example, a first triple 304 includes a first node A, a second node B, and a relationship $P_1$ between A and B. Each node in a triple may represent a data point, such as a piece of information stored in a database of a business or used in connection with operation of such a database. Each node can be a simple piece of information such as an employee name, a particular line item, a particular invoice, a class of employees, or generally any type of information or class of information that can be stored. Each node can also represent more complicated sets of information such as complete data records or files or classes of information including attributes of the class.

As a concrete example, A may represent John Doe and B may represent a specific class of employee, such as a manager. In the relationship shown in the example of the first triple 304, $P_1$ connecting A to B indicates that John Doe is a manager. As shown in the example in FIG. 3, relationships between nodes may be directional, as indicated in the example by an arrow. For example, continuing with the example of the first triple 304, the arrow extending from A to B indicates that John Doe is a manager but not necessarily that all managers are John Doe. A node may relate to more than one other nodes. For example, FIG. 3 shows a second triple 306, showing a relationship $P_3$ between the node A and a node D. Thus, considering both the first triple 304 and the second triple 306, it can be seen that the node A relates to both B and to D by two different relationships. Specifically, A is related to B by $P_1$ and related to D by $P_3$. For example, D may indicate a class of employees having access to a particular system, such as a security system, accounting computer system, and the like. Thus, read together, the first triple 304 and second triple 306 indicate that John Doe is a manager, and John Doe also has access to the system represented by D. In addition, various nodes can be related to each other through inferred relationships. Briefly, for example, FIG. 3 shows a third triple 308 showing a relationship $P_4$ between nodes B and C. Continuing the example discussed above, C may be a specific set of accounting data for an organization. Thus, the relationship represented by the third triple indicates that all managers have access to the accounting data. Thus, when reading the first triple 304 and the third triple 308 together, a relationship between A and C may be inferred that John Doe has access to accounting data because John Doe is a manager. Further details on inferred relationships are provided below.

In an embodiment, the data set 300 may be represented in a matrix. For example, FIG. 3 shows a matrix 310 in accordance with an embodiment. The matrix 310, in the example shown, is formed by a series of row vectors, each row vector corresponding to a relationship of the data set 300. As shown in the example, the order of the row vectors of the matrix 310 does not have any particular significance; however, specific orderings, such as an ordering proceeding according to an index of possible relationships, and other orderings may be used.

Each column vector in the matrix 310 represents a node and, as with the row vectors, the columns need not be in any particular order, but may be. Matrix 310 comprises an entry at each intersection of a row vector and a column vector. The entries in the matrix 310 store values that encode data set 300. In an embodiment that values for the entries in matrix 310 are either zeros or ones. Although the example given shows entries having values of 0 or 1, other values, such as Boolean values of "true" and "false," or generally any set of distinguishable values may also be used in alternative embodiments.

As noted, the columns and rows of the matrix 310 may or may not be in any particular order. For instance, in an embodiment, data is extracted from one or more data stores and used to construct the matrix and the manner or order in which the matrix is constructed or extracted may dictate the matrix's initial form. For instance, in an embodiment, rows may be added to the matrix sequentially as relationships between extracted data are determined. In another embodiment, columns may be appended to the matrix as each data point is examined to determine the relationships associated with the data point.

In an embodiment, a particular row includes entries of zero or one. The relationship associated with the row may be determined by the one entries. Specifically, a column of the matrix that intersects the row at a one entry is associated with a node involved in the relationship. Likewise, a column of the matrix that intersects the row at a zero entry is associated with a node that is not involved in the relationship. Thus, counting from the top, looking at the first row of the matrix 310 which corresponds to the relationship $P_{12}$, the intersection between the A column and the $P_{12}$ row includes a zero entry thereby indicating that relationship $P_{12}$ does not involve the node A. The intersections of the $P_{12}$ row with columns J and I includes entries of one, indicating that the relationship $P_{12}$ involves I and J. In a like manner, ones or zeroes are filled in matrix 310 to represent the relationships represented by data set 300.

It should be understood that, while FIG. 3 shows a matrix representation of the data set 300, other representations can be used. For example, matrices may be constructed differently than shown in the figures. For instance, in an alternative embodiment, row vectors may correspond to nodes while column vectors may correspond to relationships. As another example, as is known, data sets stored in ontologies may be represented in a graph, a directed graph, or another representation which may encode data differently. Techniques analogous to the techniques described below, such as techniques for graph partitioning, may also be used in accordance with the present invention. Further, it should be understood that while the examples in the figures show graphical representations of specific matrices, including the entries of the matrices, matrices corresponding to data sets will typically be too large to be displayed in the same manner, but may be stored in computer memory (either volatile or non-volatile) in a manner dictated by a specific application used to create the matrices or other representations of the data.

In an embodiment, the matrix 310 is partitioned into a convenient form, for example, by using known techniques of linear algebra. For instance, the matrix 310 may be placed into block form by using elementary row operations such as swapping rows. Column operations, such as switching columns, may also be used. When row, column, or other operations are used, an index vector, list, or other mechanism that may be part of the matrix or stored in another location, may be updated to keep track of which relationships and/or nodes correspond to each vector. For example, each entry of the first row may include information (such as a string or number) identifying a particular relationship and the first entry of each column may include information identifying a particular node. In this manner, when a row or column operation is performed, the identifying information of the associated rows and/or columns are affected by the operation in a way that keeps track of the rows and/or columns. As a concrete example, if the first and second rows are switched, in an embodiment, the information identifying the first row moves to the second row and the information identifying the second row moves to the first TOW.

In an embodiment, partitioning a matrix includes arranging the columns such that the matrix encodes the directions of the relationships of the represented triples. Thus, the columns may be arranged such that the column corresponding to the first node in a triple is to the left of the column corresponding to the second node in the triple. Other configurations of matrices that encode the direction of the relationships may also be used, such as the inclusion of an additional encoding column that includes entries that correspond to the direction of triples included in a particular row. For instance, an additional column may be added to the matrix 310 so that the intersection of a row with the additional column includes a 0 if the order of the columns corresponds to the direction of the relationship encoded in the row and a 1 otherwise. For instance, the first row has a 1 in the intersections with the I and J columns, but the J column appears before the I column, so the order to the I and J columns does not correspond to the relationship $P_{12}$ extending between the I and J nodes. Therefore, in this example, an encoding column would have a 1 in the intersection of the first row with the encoding column to indicate that the relationship $P_{12}$ extends from I to J.

In an embodiment, with the columns arranged, the rows are arranged so that the matrix is in block form. Matrices used in accordance with the present invention will generally be sparse matrices because each row, in an embodiment, will have only two non-zero entries corresponding to the specific data represented in the row. As a result, such partitioning may be performed to form a matrix having more than one block which is convenient for visualizing and processing of the data set 300, as described more fully below.

Generally, when a matrix is used to encode data, the matrix can be partitioned into a convenient form, such as block form, using various techniques. For example, spectral partitioning can be used to partition incidence, Laplacian, or other matrices that encode a graph representative of ontological data. Likewise, multilevel coarsening and partitioning techniques, such as those that coarsen, partition, and then uncoarsen a matrix may be used. Of course, hybrid approaches of the above techniques and/or other techniques can be used as well.

It should be noted that such rearrangement of the columns may not be straight forward if a data set includes a circuit, which is a set of one or more nodes and one or more relationships arranged such that an inferred or direct relationship exists between a node and itself. For example, a circuit exists in a situation where A relates to B, B relates to C, and C relates to A, with the directions of the relationships extending from A to B, from B to C, and from C to A. With a circuit, it is not straight forward to order the columns in order to encode the directions of the relationships without taking additional measures. For instance, in the circuit described above, the C column would have to occur simultaneously before and after the A column. Nevertheless, one with ordinary skill in the art would recognize that such situations may be remedied through a variety of techniques. For example, a data set may be pre-processed to locate any circuits. If any circuits are found, triples may be removed from the data set to break any circuitous paths. For instance, the triple of C to A may be removed in the example given above so that A does not indirectly refer to itself. The removed triples may be separately processed and the results of the separate processing may be combined with results of processing the modified data set.

Figure 4:
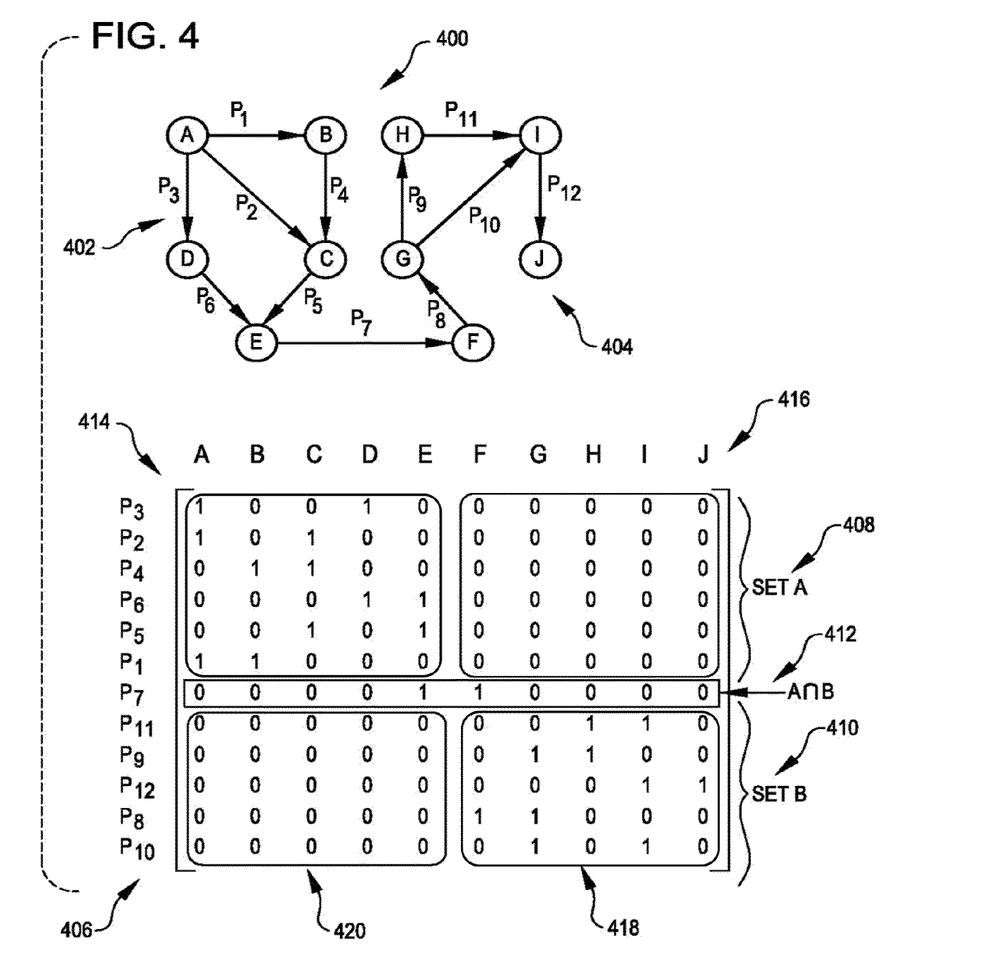
FIG. 4 shows the data set and the matrix of FIG. 3 in partitioned form.

Because the data set 300 is stored in an ontology, it can be considered as a graph, having vertices being the nodes and the relationships being edges. In an embodiment, partitioning a matrix representative of a data set can be visualized by equivalent operations on a graph representing the data set. For instance, FIG. 4 shows a representation of a graph 400 of a data set such as the data set 300, above, which shows the transitive properties of the data set. For example, if A is related to B and B is related to C, then the graph shows edges connecting B to both A and C. As shown in the example, the graph 400 includes a first subgraph 402 and a second subgraph 404. The first subgraph 402 and the second subgraph 404 are related to each other through the relationship $P_7$ connecting node E, which is in the first subgraph 402, to node F, which is in the second subgraph 404. In this manner, processing the data set 300 can be performed by separately processing data in the subgraphs and combining the results. For example, the data in the first subgraph 402 may be processed in a first processor executing instructions for a first reasoner instance, the data in the second subgraph 404 may be processed in a second processor executing instructions for another reasoner instance, which may employ the same or a different set of rules for processing than the first reasoner instance. Either the first or second (or another) processor may be used to combine the results according to the relationship $P_7$.

It should be understood that data sets will vary and, as a result, decomposition of a graph representing a data set will vary accordingly. For instance, a graph may be partitioned into subgraphs that are disconnected, or may be partitioned into subgraphs that are connected to one another by more than one edge. In addition, a typical data set, in accordance with an embodiment, will be partitioned into more than two subgraphs which may be processed separately. Further, data in some subgraphs may be processed in one processor, while data in other subgraphs may be processed in another processer or processors.

Turning to the matrix representation, FIG. 4 also shows a matrix 412 which has been partitioned into a convenient form. For example, the matrix 412 in an embodiment is a matrix resulting from the transformation of the matrix 310, described above. As described above, the columns of the unpartitioned matrix 310 have been rearranged such that they encode the direction of the relationships between the nodes. In an embodiment, if a relationship extends from a first node to a second node, then the column associated with the first node is placed before the column associated with the second node. For example, because the relationship $P_1$ extends between A and B, the A column is placed before the B column.

Further, the rows of the matrix 412 have been arranged so as to put the matrix in block form which, as described below, results in partitioning the data into separately processable partitions. As discussed above, many different techniques for partitioning matrices into block form may be used in accordance with various embodiments. As shown, the matrix 412 includes a first vector set 408 (SET A) comprising the upper seven rows of vectors and a second vector set 410 (SET B) comprising the lower six rows of vectors, where the first vector set 408 is above the second vector set 410. An intersection vector set 412 comprises the row vectors that are common to both the first vector set 408 and second vector set 410. As discussed, the matrix and sub matrices of FIG. 4 are provided for the purposes of illustration and, generally, matrices used in accordance with various embodiments may have vector sets and sub matrices having different characteristics, such as more or less rows.

As shown in the example, the first vector set 408 includes a first submatrix 414 in the upper left corner that comprises entries that are either zero or one and a first zero matrix 416 in the upper left corner that comprises entries that are all zero. In an embodiment, the first submatrix 414 is situated to the left of the first zero matrix 416. Likewise, the second vector set 410 includes a second submatrix 418 and a second zero matrix 420 where the second submatrix 418 sits to the right of the second zero matrix 420 and the second submatrix 418 includes entries being zero or one and the second zero matrix 420 having entries all zero. In this manner, it can be seen that the partitioned matrix 406 is partitioned into discreet blocks and may include a vector connecting the blocks. While the partitioned matrix 406 is composed of four block matrices and the intersection vector 412, it should be understood that data sets, in general, in accordance with an embodiment, will be partitioned into a larger or smaller number of blocks which may or may not be separated by non-zero intersection row vectors. In addition, it should be understood that the particular positioning of the blocks of the matrix 406 is made according to mathematical convention with the blocks located along a main diagonal of the matrix 406, but that other configurations are possible.

Returning to the example in the drawing, the first submatrix 414 encodes the first subgraph 402 while the second submatrix 418 encodes the second subgraph 404 in the manner described above. The intersection vector encodes the relationship between the first subgraph 402 and the second subgraph 404. If a graph of a data set includes two disconnected subgraphs, a partitioned matrix representation may not include any intersection vectors between blocks representing the disconnected subgraphs. In addition, one or more row vectors of all zero entries may be situated between blocks representing disconnected subgraphs.

In an embodiment, a map function and a reduce function are employed in order to distribute the reasoning of an ontology among various processors and to combine the results of the distributed reasoning. Reasoning an ontology may include application of a predefined set of rules to the data of the ontology. As an example, a commonly used rule in reasoning ontologies is the transitive rule where, if node A relates to node B and node B relates to node C, then node A relates to node C. Other rules, depending on specific applications, may be used in addition to or in place of the transitive rule. In an embodiment, the map function takes as input data corresponding to a subgraph of a graph representing an ontology and a set of rules to be used by a reasoner to process the individual triples represented in the subgraph. For a subgraph and set of rules input to the map function, the output of the map function includes data corresponding to a subgraph (typically a different subgraph) and an inferred vector which may encode information about one or more triples. In an embodiment, the subgraphs output by the map function may include nodes that are common to more than one subgraph so as to encode any relationships between subgraphs.

Figure 5:
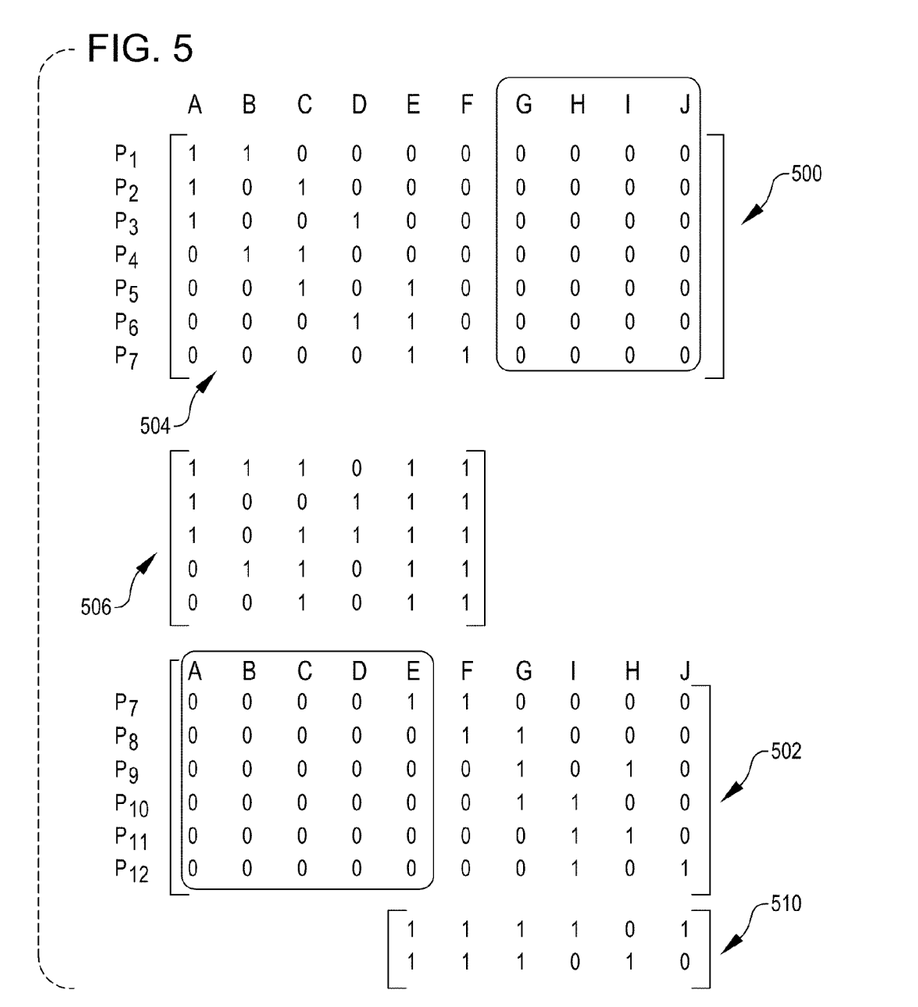
FIG. 5 shows results of a map function derived from the matrix of FIG. 4, in accordance with an embodiment.

FIG. 5 shows a specific example of matrices resulting from a map function that can be used in accordance with an embodiment. Specifically, FIG. 5 shows a first vector set 500 and a second vector set 502 in accordance with an embodiment. In an embodiment, the first vector set 500 encodes the first vector set 408 and intersection vector 412 described above in connection with FIG. 4. Referring back to FIG. 4, the first vector set 500 encodes the first subgraph 402 and the triple including nodes E and F, and the relationship $P_7$ extending between E and F. In this manner, the first vector set 500 encodes the first subgraph 402 and the triple connecting the first subgraph 402 to the second subgraph 404. In an embodiment, the first vector set 500 encodes the first subgraph 402 and triple including E, F, and $P_7$ in a manner similar to that described in connection with FIGS. 3 and 4.

Similarly, the second vector set 502 encodes the second vector set 410 and the intersection vector 412 described above in connection with FIG. 4, thereby encoding the second subgraph and the triple represented by E, F, and $P_7$. As shown in FIG. 5, in an embodiment, the row vectors of the first set of vectors 500 are simply the row vectors of the first data set 408 and intersection vector 412. In this manner, the map function outputs the first vector set 500 and second vector set 502. Subgraphs corresponding to the first vector set 500 and second vector set 502 may be ascertained from the entries in the vector sets, as described above. In an embodiment, the first vector set 500 forms a first matrix 504 which may be in block form and whose columns and rows represent nodes and relationships, respectively, as described above.

As noted above, the map function also outputs inferred vectors which may encode the relationship between two or more nodes as determined by a reasoner. For example, a set of rules may include a transitive rule for an ontology which provides, for example, that if A is related to B and B is related to C then A is related to C. The set of rules may also include information identifying which rows should be considered when implementing the transitive rule. The transitive rule in processing of ontologies is convenient because when matrix representations are used, as described above, processing the transitive rule on a subgraph can be performed using an OR operation of the relevant rows which is computationally efficient. In an embodiment, an OR operation on a plurality of rows is performed by performing an OR operation on corresponding entries in the rows. For example, if the third entry of one row is a zero and the third entry of another row is zero, an OR operation performed on the two rows will have a zero in the third entry. If the third entry of both rows is a one, then an OR operation performed on the two rows will have a zero in the third entry. If one of the rows has a one in the third entry and the other row has a zero in the third entry, then the result of an OR operation performed on the two rows will have a one in the third entry.

In an embodiment, the inferred vectors form a set of inferred vectors whose columns and rows encode triples as described above. For example, a first inferred vector set 506 results from processing the first vector set 500 according to a plurality of user-selected or predefined rules of a reasoner. Likewise, a second inferred vector set 510 results from processing the second vector set 502. In the example shown, the first row of the first inferred vector set 506 is a result of performing an OR operation on the rows $P_1$, $P_4$, $P_6$ and $P_7$ of the first submatrix 504. This particular operation, for instance, may be chosen by a user of the reasoner and any suitable operation or operations may be used. Likewise, the remaining rows of the inferred vector set 506 are formed using various OR operations on various rows of the first submatrix 504 depending on the particular rules chosen by the user. Generally, the type of operations used to make inferred vector sets will vary depending on specific applications and reasoners and it should be understood that the particular operations used to form the inferred vector sets are chosen merely as an example.

In an embodiment, a reduce function is constructed or provided whose input includes information about subgraphs and inferred triples from each subgraph. For example, the input of the reduce function may include a list of nodes directly related to nodes of the subgraph. Thus, the input of the reduce function may include all the nodes of the subgraph as well as one or more nodes of another subgraph related to the input subgraph by a relationship. For example, in reference to the first subgraph 402 and second subgraph 404 shown in FIG. 4, the input of the reduce function may include the list {{A, B, C, D, E, F}, {F, G, H, I, J}}. In this example, the nodes A, B, C, D, E, and F are from the first subgraph 402 and the nodes F, G, H, I, and J are from the second subgraph 404. The node F is included in both lists because it is the node in the second subgraph 404 to which the first subgraph 402 refers through the relationship $P_7$. The input of the reduce function may also include a list of inferred triples within the subgraphs, such as a triple including nodes A and E.

The reduce function determines, based upon the input, whether additional reasoning should take place. For instance, referring to the same example, because the first subgraph 402 and second subgraph 404 are related to each other by the relationship $P_7$, the reduce function then takes the inferred triples from each subgraph and applies the rules of the reasoner to the inferred triples input to the function and returns a list of inferences. For complicated data sets, the reduce function may be applied repeatedly or recursively to ensure that desirable inferences are identified. Thus, for example, the output of the reduce function may include an inferred triple that includes the nodes A (from the first subgraph 402) and J (from the second subgraph 404), because A and J are indirectly related to one another through a series of relationships.

FIG. 6 shows an example of the output of a reduce function using the input from the example shown in FIG. 5. In particular, FIG. 6 shows a matrix 600 (inference library) whose columns correspond to nodes and whose rows correspond to inferred triples. The inferred triples may be, for example, a result of applying a reasoner to the first inferred vector set 506 and second inferred vector set 510 of FIG. 5. As a specific example, the first row of the matrix 600 shows an inference from A to J because there is a 1 in the intersection of the A and J columns with the first row. The first row also shows the nodes involved in an inference from A to J. For instance, the intersection of the B, C, E, F, G, I columns with the first row includes a 1 while the intersection of the D and H columns includes a 0. As a result, the matrix 600 encodes information indicating that an inference from A to J may include a path extending through nodes B, C, E, F, G, and I. Likewise, the fourth row of matrix 600 encodes another inference from A to J that may include a path extending through nodes C, D, E, F, G, and I.

FIG. 8 demonstrates how embodiments of the disclosed invention allow for efficient handling of new, deleted, and/or modified data. In an embodiment, an ontology 802 representing a data set is partitioned into a plurality of subontologies, represented in the figure by $SO_1$ through $SO_n$. When a piece of data of the data set is modified, one or more triples of an ontology representing the data set change when the ontology is updated. For instance, FIG. 8 shows a vector 804 representative of a triple changed because of a change in a corresponding data point. Because of the partitioning of the ontology in accordance with embodiments of the present invention, it is possible to map the changed vector to only those subontologies affected by the change. For example, the changed vector may be mapped to a single subontology, a subset of the subontologies, or all subontologies. Because the vector is mapped to only the affected subontology or subontologies, updating the ontology may involve only updating the affected ontologies. An inference library 806, such as the inference library represented by the matrix 600. described above in connection with FIG. 6, may be updated, for example by using MapReduce techniques, by updating only the portions of the reference library affected by a change in affected ontologies instead of updating the complete reference library. Further, when multiple vectors representing triples change, the vectors can be likewise mapped to affected subontologies and updating the entire ontology can then be spread over a plurality of processors. Thus, the amount of resources spent updating an ontology based on changed data may be significantly reduced.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method of processing an ontology, comprising:
   storing data in an ontology that includes a plurality of triples;
   partitioning the ontology into a plurality of partitions by at least representing the triples as vectors in a matrix and partitioning the matrix into block form;
   distributing the partitions among a plurality of reasoner instances;
   directing the reasoner instances to reason the partitions; and
   combining results from the reasoner instances.

2. The method of claim 1, wherein said matrix, when in block form, comprises a plurality of blocks, each of said blocks corresponding to a sub-ontology of said ontology.

3. The method of claim 1, wherein combining results from the reasoner instances includes creating an inference library comprising a plurality of inferred triples.

4. A computer-implemented method of processing an ontology, comprising:
   storing data in an ontology;
   partitioning the ontology into a plurality of partitions, wherein each partition is a sub-ontology of the ontology;
   changing a datum of said data, said datum associated with a subset of said partitions; and
   updating said subset according to the datum;
   distributing the partitions among a plurality of reasoner instances;
   directing the reasoner instances to reason the partitions; and
   combining results from the reasoner instances.

5. The method of claim 4, wherein combining results from the reasoner instances includes creating an inference library comprising a plurality of inferred triples and wherein updating said subset includes updating the inference library by updating portions of the inference library affected by the change in said datum.

6. A non-transitory computer-readable storage medium having stored thereon instructions for causing at least one processor to perform a method for processing ontological data, the computer-readable storage medium including:
   instructions for distributing ontological data, including a plurality of triples, among a plurality of ontologies by at least representing the triples as vectors in a matrix and partitioning the matrix into block form;
   instructions for directing a plurality of reasoner instances to reason said ontologies to produce a first set of inferences; and
   instructions for directing at least one reasoner instance to reason said first set of inferences to produce a second set of inferences.

7. The computer-readable storage medium of claim 6, wherein said matrix, when in block form, comprises a plurality of blocks, each of said blocks corresponding to one of said plurality of ontologies.

8. The computer-readable storage medium of claim 6, wherein the instructions for directing at least one reasoner instance to reason said first set of inferences includes instructions for creating an inference library comprising a plurality of inferred triples.

9. The computer-readable storage medium of claim 6, wherein the matrix, when in block form, comprises a plurality of blocks, each of the blocks corresponding to a sub-ontology of the ontology.

10. The computer-readable storage medium of claim 6, wherein the matrix, when in block form, comprises a plurality of blocks, each of the blocks being separately processable by one or more reasoners.

11. A non-transitory computer-readable storage medium having stored thereon instructions for causing at least one processor to perform a method for processing ontological data, the computer-readable storage medium comprising:
- instructions for distributing ontological data among a plurality of ontologies, wherein the distributing includes encoding the ontological data into matrix form and encoding each ontology as a matrix and partitioning the matrix into block form such that each ontology corresponds to a block in the matrix;
- instructions for changing a datum of said ontological data, said datum associated with a subset of said plurality of ontologies;
- instructions for updating said subset according to the datum;
- instructions for directing a plurality of reasoner instances to reason said ontologies to produce a first set of inferences; and
- instructions for directing at least one reasoner instance to reason said first set of inferences to produce a second set of inferences.

12. The computer-readable storage medium of claim 11, wherein the instructions for directing at least one reasoner instance to reason said first set of inferences includes instructions for creating an inference library and wherein the instructions for updating said subset includes instructions for updating portions of the inference library affected by the change in said datum.

13. The computer-readable storage medium of claim 11, wherein each block in the matrix corresponds to a sub-ontology.

14. The computer-readable storage medium of claim 11, wherein each block in the matrix is separately processable by one or more reasoner instances.

15. A system for processing ontologies, comprising:
- a data store having stored therein an ontology that includes a plurality of triples represented as vectors in a matrix;
- a plurality of reasoners, each of said reasoners operable to reason a partition of said ontology; and
- at least one processor operable to partition the ontology into a plurality of partitions by at least partitioning the matrix into block form, distribute the partitions among the plurality of reasoners, direct the reasoners to reason the partitions, and combine results from the reasoners.

16. The system of claim 15, wherein each partition is a sub-ontology of the ontology.

17. The system of claim 15, wherein each of the plurality of partitions is separately processable by at least one of the plurality of reasoners.

18. The system of claim 15, wherein the ontology comprises data and wherein said at least one processor is further operable to:
- create an inference library comprising a plurality of inferred triples; and
- update said reference library by updating triples of the inference library affected by a changed datum of said data.

19. A system for processing ontologies, comprising:
- a data store having stored therein an ontology, wherein the ontology includes a plurality of triples represented as vectors in a matrix, said matrix in block form and comprising a plurality of blocks, each of said blocks corresponding to a sub-ontology of the ontology;
- a plurality of reasoners, each of said reasoners operable to reason a partition of said ontology; and
- at least one processor operable to partition the ontology into a plurality of partitions, distribute the partitions among the plurality of reasoners, direct the reasoners to reason the partitions, and combine results from the reasoners.

20. The computer system of claim 19, wherein the ontology comprises data and wherein said at least one processor is further operable to:
- create, based at least in part on the results from the reasoners, an inference library comprising a plurality of inferred triples; and
- update said reference library by updating triples of the inference library affected by a changed datum of said data.

* * * * *